Feb. 14, 1933.    S. O. HOUGE    1,897,053
GREASE RACK
Filed Sept. 2, 1931
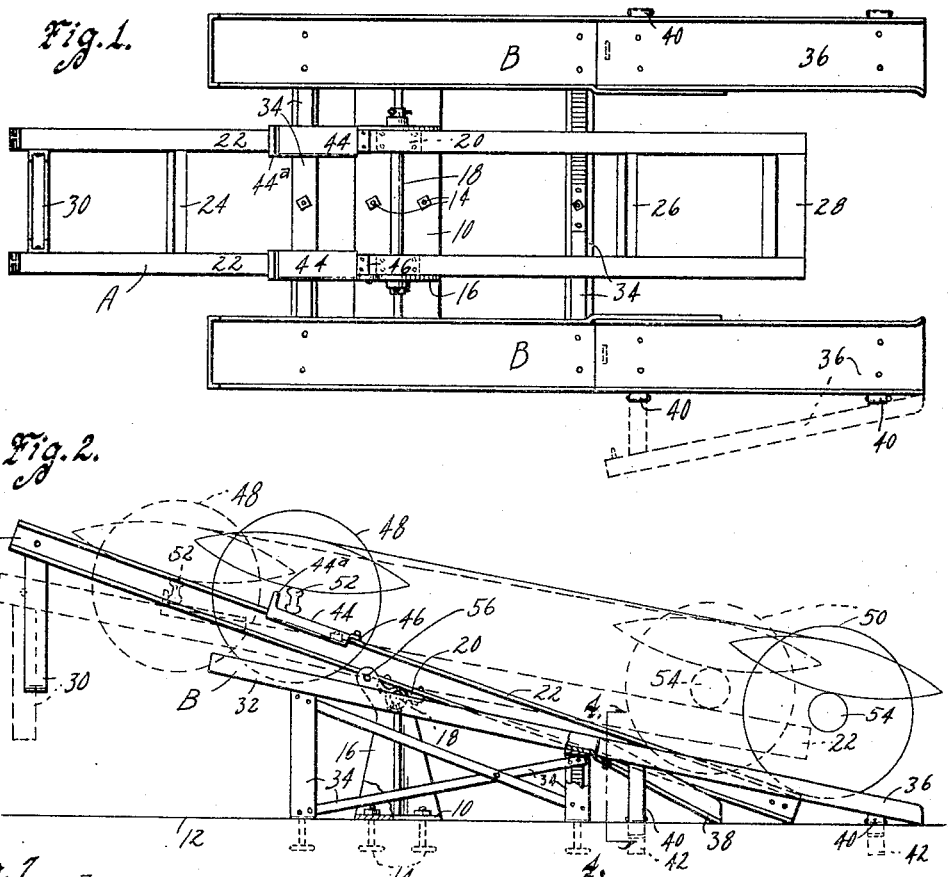
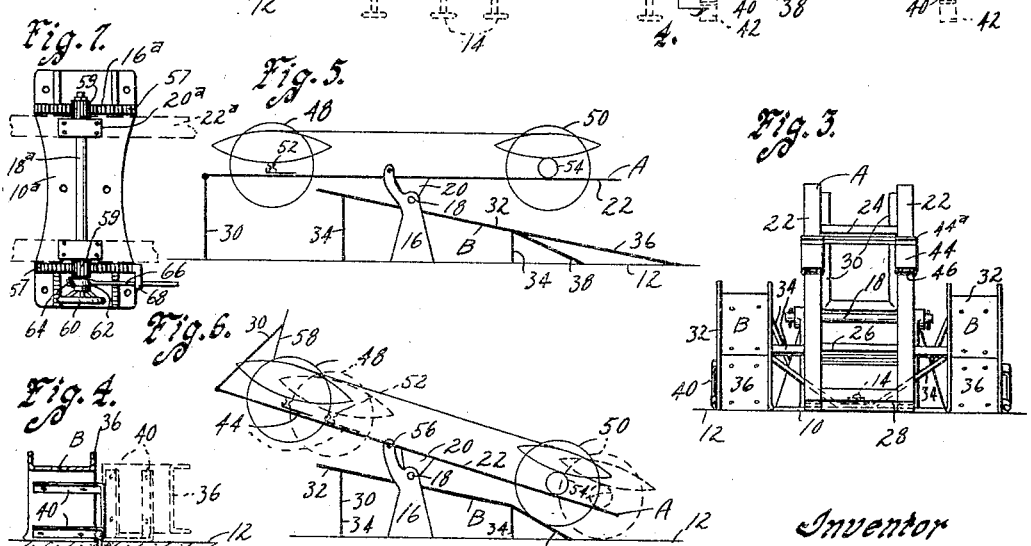

Patented Feb. 14, 1933

1,897,053

UNITED STATES PATENT OFFICE

SEVERT O. HOUGE, OF SLATER, IOWA

GREASE RACK

Application filed September 2, 1931. Serial No. 560,782.

The object of my invention is to provide a grease rack which is simple, durable and comparatively inexpensive to manufacture.

A further object is to provide a grease rack for supporting an automobile, so that the automobile may be tipped to an inclined position where access is easily had to the undersurface of the chassis for lubricating parts and bearings thereof.

More particularly, it is my object to provide a grease rack having a pivoted platform for supporting an automobile in inclined greasing position and inclined tracks of novel character for conveniently positioning the automobile on the platform.

A further object is to provide inclined tracks having removable track portions to facilitate removal of the automobile from the platform after having been positioned thereon by driving the automobile up the tracks and the upper wheels off the upper ends of the tracks.

Still a further object is to provide a prop pivoted on the platform and axle rests slidable thereon for facilitating use of the grease rack.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view of a grease rack embodying my invention.

Figure 2 is a side elevation of the same, showing an automobile diagrammatically thereon and a dotted line position as well as a full line position of the platform and automobile.

Figure 3 is a rear end elevation of the grease rack.

Figure 4 is a sectional view on the line 4—4 of Figure 2, illustrating a track portion in a different position by dotted lines.

Figures 5 and 6 are diagrammatic views showing the operation of the grease rack; and Figure 7 is a plan view of an adjustable platform mounting for the grease rack.

On the accompanying drawing, I have used the reference numeral 10 to indicate a base plate. The base plate 10 may be secured to a concrete floor or the like 12 by means of anchor bolts 14 and is provided with upstanding brackets 16. Supported in the upstanding brackets 16, is a rock shaft 18. The rock shaft 18 supports bearings 20.

The bearings 20, in turn, support a platform A consisting of side rails 22 connected by cross rails 24, 26 and 28. The bearings 20 are substantially centrally located with respect to the length of the platform A and the member 28 may be made comparatively heavier than the members 24 and 26 to normally cause the rack A to remain tipped in one predetermined position. A U-shaped prop 30 is pivoted to the opposite end of the platform A.

For the purpose of positioning an automobile on the platform A, I provide tracks B. The tracks B have stationary portions 32 mounted on a frame 34 and movable portions 36. The portions 36 rest at their upper ends on auxiliary tracks 38 located beneath them and at their lower ends on the floor 12. They are secured permanently to the floor by means of hinge members 40 pivoted to hinge members 42. The hinge members 42 extend into the floor 12 in the event it is made of concrete, or may be bolted or otherwise suitably secured to a wooden floor or the like.

Slidably mounted on the rails 22 of the platform A, I provide axle blocks 44, which may have flanges extending down and under the upper flanges of the rails 22, which are preferably of I-beam construction. Stop blocks 46 are provided for limiting movement of the axle blocks 44 in one direction relative to the platform A.

*Practical operation*

In the operation of my device, an automobile is driven up the tracks B when the parts are in the full line positions shown in Figures 1 and 2. The front and rear wheels and front and rear axles of the automobile are indicated at 48, 50, 52 and 54, respectively. The automobile, in being driven up the tracks B, will assume the full line position shown in Figure 2, with the front axle 52 beginning to engage the axle blocks 44. The axle 52 will then engage the lugs 44a of the axle blocks 44 and slide the blocks along the rails 22 to the dotted line position shown in Figure 2, wherein the front wheels 48 are being driven off the upper ends of the tracks B, thus swinging the platform A counterclockwise and lifting the rear weighted end 28 thereof, so that the platform engages the rear axle 54 also.

It will be noted that over half the automobile is still back of the pivot shaft 18, so that the automobile can be further driven through the traction of the rear wheels 50 on the tracks B, the axle blocks 44 continuing to slide along the platform A and the rear axle 54 likewise sliding.

Upon cessation of traction, which will occur when the automobile is overbalanced, the platform A will swing to the position shown in Figure 5, the prop 30 acting as a limit stop. The track portions 36 may now be swung to the dotted line positions shown in Figures 1 and 4, so that the automobile on the platform A can be tipped to the inclined position shown in Figure 6 and may be locked in this position by inserting a pin 56 through an extension lug on one of the brackets 16. This is the greasing position and the prop 30 may be swung out of the way, as against the radiator 58. After the greasing operations have been completed, the automobile may be removed from the platform A by driving it backwards, to and beyond the dotted line position shown in Figure 6. During this portion of the operation, the driver of the automobile needs the help of an assistant to keep the prop end of the automobile A raised sufficiently to provide traction for sliding the axle blocks 44 rearwardly to the position shown in Figure 2 and in dotted lines in Figure 6, whereafter the automobile may be driven off the platform and down the track portions 32 and the auxiliary tracks 38.

It will be obvious that if the track portions 36 were not removable, the automobile could not be driven off the platform A, because the front wheels 48 are off the tracks B, but removal of the track portions 36 allows sufficient tipping of the platform so that the front wheels 48 may be easily located over the track portions 32 before removing the automobile from the grease rack.

In Figure 7 I have shown an adjustable mounting whereby to illustrate one adaptation of the grease rack for use with widely varying lengths of automobiles. In this remounting, the brackets 16a have racks 57 for pinions 59 of the rock shaft 18a to mesh with and rest on. By rotating the shaft 18a (a hand wheel 60 being provided for this purpose) the pivot for the platform A may be adjusted relative to the tracks B for permitting proper operation of the grease rack, as hereinbefore described, regardless of the length of the automobile in proportion to the size of the rack parts. Means (such as a split block 62, clamp bolt 64 and rod-like arm 66 slidably extending through a stationary ear 68) is provided for locking the pivot rock shaft 18a in any desired position.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a grease rack for automobiles, a pivoted platform for supporting an automobile, inclined tracks for positioning an automobile on said platform by driving the automobile up the tracks and the wheels at the upper end of the automobile off the upper ends of the tracks, portions of said tracks being removable to allow tipping of said platform to a position where said wheels are above alignment with said tracks to facilitate removal of the automobile from the platform and down the tracks.

2. In a grease rack for automobiles, a pivoted platform for supporting an automobile, inclined tracks for positioning an automobile on said platform by driving the automobile up the tracks and the wheels at the upper end of the automobile off the upper ends of the tracks, portions of said tracks being removable to allow tipping of said platform to a position where said wheels are above alignment with said tracks to facilitate removal of the automobile from the platform and down the tracks and auxiliary tracks in place of said track portions for said automobile to travel down during such removal.

3. In a grease rack for automobiles, a pivoted platform for supporting an automobile, inclined tracks for positioning an automobile on said platform by driving the automobile up the tracks and the wheels at the upper end of the automobile off the upper ends of the tracks, portions of said tracks being removable to allow tipping of said platform to a position where said wheels are above alignment with said tracks to facilitate removal of the automobile from the platform and down the tracks and auxiliary tracks in place of said tracks portions and of steeper inclination than said track portions for said automobile to travel down during such removal.

4. In a grease rack for automobiles, a pivoted platform for supporting an automobile, inclined tracks for positioning an automobile on said platform by driving the automobile up the tracks and the wheels at the upper end of the automobile off the upper ends of the tracks, means for limiting pivotal movement of said platform and said automobile in one direction after such positioning, portions of said tracks being removable to allow tipping of said platform in an opposite direction to a position where said wheels are above alignment with said tracks to facilitate removal of said automobile from said platform and down said tracks.

5. In a grease rack for automobiles, a pivoted platform for supporting an automobile, inclined tracks for positioning an automobile on said platform by driving the automobile up the tracks and the wheels at the upper end of the automobile off the upper ends of the tracks, means for limiting pivotal movement of said platform and said automobile in one direction after such positioning, portions of said tracks being removable to allow tipping of said platform in an opposite direction to a position where said wheels are above alignment with said tracks and means for locking said platform in such position.

6. In a grease rack for automobiles, a pivoted platform for supporting an automobile, inclined tracks for positioning an automobile on said platform by driving the automobile up the tracks and the wheels at the upper end of the automobile off the upper ends of the tracks, portions of said tracks being pivoted to swing from their initial position to facilitate removal of said automobile from said platform and down said tracks.

7. In a grease rack for automobiles, a pivoted platform for supporting an automobile, inclined tracks for positioning an automobile on said platform by driving the automobile up the tracks and the wheels at the upper end of the automobile off the upper ends of the tracks, portions of said tracks being pivoted to swing from their initial position to facilitate removal of said automobile from said platform and down said tracks and auxiliary tracks in place of said track portions for said automobile to travel down during such removal.

8. In a grease rack for automobiles, a pivoted platform for supporting an automobile, inclined tracks for positioning an automobile on said platform by driving the automobile up the tracks and the wheels at the upper end of the automobile off the upper ends of the tracks, slidable blocks on said platform for the axle of said wheels to engage while the wheels are traveling up said tracks, portions of said tracks being removable to allow tipping of said platform to a position where said wheels are above alignment with said tracks to facilitate removal of the automobile from the platform and down the tracks.

9. In a grease rack for automobiles, a pivoted platform for supporting an automobile, inclined tracks for positioning an automobile on said platform by driving the automobile up the tracks and the wheels at the upper end of the automobile off the upper ends of the tracks, portions of said tracks being removable to allow tipping of said platform to a position where said wheels are above alignment with said tracks to facilitate removal of the automobile from the platform and down the tracks.

10. In a grease rack for automobiles, a pivoted platform for supporting an automobile, inclined tracks for positioning an automobile on said platform by driving the automobile up the tracks and the wheels at the upper end of the automobile off the upper ends of the tracks, the pivotal axis of said platform being adjustable longitudinally of said tracks, portions of said tracks being removable to allow tipping of said platform to a position where said wheels are above alignment with said tracks to facilitate removal of the automobile from the platform and down the tracks.

11. In a grease rack for automobiles, a pivoted platform for supporting an automobile, inclined tracks for positioning an automobile on said platform by driving the automobile up the tracks and the wheels at the upper end of the automobile off the upper ends of the tracks, a prop for limiting pivotal movement of said platform and said automobile after such positioning, portions of said tracks being removable to allow tipping of said platform to a position where said wheels are above alignment with said tracks to facilitate removal of the automobile from the platform and down the tracks.

SEVERT O. HOUGE.